US010867293B2

(12) United States Patent
Bristow et al.

(10) Patent No.: US 10,867,293 B2
(45) Date of Patent: *Dec. 15, 2020

(54) IMAGE RECOGNITION-BASED PAYMENT REQUESTS

(71) Applicant: THE TORONTO-DOMINION BANK, Toronto (CA)

(72) Inventors: Lori Bristow, Toronto (CA); Paul Mon-Wah Chan, Markham (CA); Jonathan K. Barnett, Oakville (CA); Orin DelVecchio, Richmond Hill (CA); Lauren van Heerden, Bedford, NH (US)

(73) Assignee: The Toronto-Dominion Bank, Toronto (CA)

( * ) Notice: Subject to any disclaimer, the term of this patent is extended or adjusted under 35 U.S.C. 154(b) by 421 days.

This patent is subject to a terminal disclaimer.

(21) Appl. No.: 15/823,182

(22) Filed: Nov. 27, 2017

(65) Prior Publication Data

US 2018/0082278 A1 Mar. 22, 2018

Related U.S. Application Data

(63) Continuation of application No. 14/529,508, filed on Oct. 31, 2014, now Pat. No. 9,864,982.

(51) Int. Cl.
*G06Q 20/10* (2012.01)
*G06Q 20/20* (2012.01)
(Continued)

(52) U.S. Cl.
CPC ......... *G06Q 20/32* (2013.01); *G06K 9/00288* (2013.01); *G06Q 20/102* (2013.01);
(Continued)

(58) Field of Classification Search
None
See application file for complete search history.

(56) References Cited

U.S. PATENT DOCUMENTS 7,117,370 B2 10/2006 Khan et al.
7,258,268 B2 8/2007 Steiger, Jr.
(Continued)

OTHER PUBLICATIONS

Asokan et al., "The State of the Art in Electronic Payment Systems", vol. 30, Issue 9, published in 1997, pp. 28-35.
(Continued)

*Primary Examiner* — Joseph W. King
(74) *Attorney, Agent, or Firm* — Fish & Richardson P.C.

(57) ABSTRACT

The present disclosure involves systems, software, and computer implemented methods for sending payment requests to one or more persons or entities based on images in which the persons or entities appear. In one example, the process may include identifying an image associated with a payment request, the identified image containing at least one recipient associated with the payment request, and wherein the payment request includes a value, analyzing the identified image to identify the at least one potential recipient of the payment request, identifying contact information associated with the at least one identified recipient of the payment request, and sending the payment request to the at least one identified recipient of the payment request via a destination associated with the identified contact information.

18 Claims, 5 Drawing Sheets

(51) Int. Cl.
*G06Q 20/32* (2012.01)
*G06Q 20/40* (2012.01)
*G06K 9/00* (2006.01)

(52) U.S. Cl.
CPC ....... *G06Q 20/204* (2013.01); *G06Q 20/3224* (2013.01); *G06Q 20/4014* (2013.01); *G06Q 20/40145* (2013.01)

(56) References Cited

U.S. PATENT DOCUMENTS

| | | |
|---|---|---|
| 7,636,679 B2 | 12/2009 | Song et al. |
| 7,933,835 B2 | 4/2011 | Keane et al. |
| 8,073,770 B2 | 12/2011 | Cole et al. |
| 8,238,638 B2 | 8/2012 | Mueller et al. |
| 8,421,594 B2 | 4/2013 | Anders |
| 8,433,127 B1 | 4/2013 | Harpel et al. |
| 8,719,129 B2 | 5/2014 | Mehta et al. |
| 9,978,052 B2 | 5/2018 | Zhao |
| 2006/0044599 A1 | 3/2006 | Lipowitz et al. |
| 2007/0244778 A1 | 10/2007 | Bailard |
| 2009/0234764 A1 | 9/2009 | Friesen |
| 2011/0087611 A1 | 4/2011 | Chetal |
| 2011/0255736 A1 | 10/2011 | Thompson et al. |
| 2012/0158582 A1 | 6/2012 | Nuzzi |
| 2012/0158589 A1 | 6/2012 | Katzin et al. |
| 2012/0185398 A1 | 7/2012 | Weis et al. |
| 2012/0267432 A1 | 10/2012 | Kuttuva |
| 2012/0284115 A1 | 11/2012 | Reardon et al. |
| 2013/0018794 A1 | 1/2013 | Ungerland, II et al. |
| 2013/0218652 A1 | 8/2013 | Fargo et al. |
| 2013/0218757 A1 | 8/2013 | Ramanathan |
| 2014/0052621 A1 | 2/2014 | Love |
| 2014/0089195 A1 | 3/2014 | Ward et al. |
| 2014/0101049 A1 | 4/2014 | Fernandes et al. |
| 2014/0108247 A1 | 4/2014 | Artman et al. |
| 2014/0156512 A1 | 6/2014 | Rahman et al. |
| 2014/0156517 A1 | 6/2014 | Argue et al. |
| 2014/0164152 A1 | 6/2014 | Inukai |
| 2014/0214652 A1 | 7/2014 | Zheng |
| 2014/0328521 A1 | 11/2014 | Colangelo |
| 2014/0330654 A1 | 11/2014 | Turney et al. |
| 2015/0348045 A1 | 12/2015 | Agarwal |
| 2016/0125413 A1 | 5/2016 | Li et al. |
| 2017/0124540 A1 | 5/2017 | Chan et al. |
| 2018/0137577 A1 | 5/2018 | Niderberg et al. |

OTHER PUBLICATIONS

Merritt, "Mobile Money Transfer Services—The Next Phase in the Evolution of Person-to-Person Payments", Aug. 2010, 32 pages.
Begonha et al., "M-Payments: Hang up, try again," Credit Card Management, vol. 15, Dec. 2002, 11 pages.
Office Action issued in Canadian Application No. 2,910,663 dated Jun. 3, 2020, 4 pages.

IMAGE RECOGNITION-BASED PAYMENT REQUESTS

CROSS-REFERENCE TO RELATED APPLICATION(S)

This application is a continuation of and claims the benefit of priority to U.S. patent application Ser. No. 14/529,508, filed Oct. 31, 2014, the contents of which are hereby incorporated by reference.

TECHNICAL FIELD

The present disclosure relates to computer systems and computer-implemented methods for sending payment requests to one or more persons or entities based on images (e.g., photos) in which the persons or entities appear.

The concept of mobile payments, including mobile wallets, refers to a type of commerce where, in lieu of cash, checks, or credit cards, consumers can use a mobile device to pay for a wide range of services and digital or hard goods. Only recently has device and payment technology advanced enough to support a widely available system for payment. The demand for mobile payments, both in developed and developing countries, provides merchants and payment processors with significant opportunities to open markets to mobile users.

For example, PayPal, Apple, Google, Visa, MasterCard, and other financial processing providers have assisted the growth of mobile payments at traditional points of sale. Through Near Field Communication (NFC), Radio-Frequency Identification (RFID), and barcode-based solutions, more and more consumers use their mobile devices to pay for goods and services where they previously used credit cards or other means of payment.

Mobile devices, including phones and tablets, have been able to improve the payment process for varying transactions over the last few years, including by allowing users to directly use their phones to initiate and respond to payment requests. In many cases, however, the person or entity to whom payment is being requested from or sent to must be a known entity, in that they must be either a current contact of the initiating user or payment instructions must be provided (e.g., via NFC, RFID, or Wi-Fi-based communications, via direct entry of payment instructions, or others). For example, some prior systems allow users to "tap" their devices together in order to initiate a funds transfer. In others, the device can be moved nearby a payment terminal at a certain time to exchange payment details via NFC. In still others, a barcode presented on the device may be scanned by a payment terminal to process the payment.

SUMMARY

The present disclosure involves systems, software, and computer-implemented methods for sending payment requests to one or more persons or entities based on images in which the persons or entities appear. In one example, the process may include identifying an image associated with a payment request, the identified image containing at least one recipient associated with the payment request, and wherein the payment request includes a value, analyzing the identified image to identify the at least one potential recipient of the payment request, identifying contact information associated with the at least one identified recipient of the payment request, and sending the payment request to the at least one identified recipient of the payment request via a destination associated with the identified contact information.

In some implementations, the identified image is received from a mobile device. In some instances, the payment request may be a request to send a payment or a request for payment. Analyzing the identified image to identify at least one potential recipient of the payment request can include performing facial recognition on the identified image to identify at least one potential recipient of the payment request. Analyzing the identified image to identify at least one potential recipient of the payment request may further includes performing a verification operation on the at least one identified potential recipient of the payment request. The verification operations may include identifying location metadata associated with the identified image and a time the image was generated, identifying information describing the location of the at least one identified potential recipient at the time the image was generated, and comparing the identified location metadata with the identified information describing the location of the at least one identified potential recipient at the time the image was generated. In some instances, the information describing the location of the at least one identified potential recipient at the time the image was generated may be determined or identified from a social network posting. Alternatively or in combination, the information describing the location of the at least one identified potential recipient at the time the image was generated may be identified based on location data from the at least one identified potential recipient's mobile device. Alternatively or in combination, the information describing the location of the at least one identified potential recipient at the time the image was generated may be identified based on locations associated with credit purchases made by the at least one identified potential recipient at the time the image was generated. In some instances, the verification operation can include identifying contextual information related to a relationship between a user initiating the payment request and the at least one identified potential recipient of the payment request and determining whether a degree of relationship between the user initiating the payment request and the at least one identified potential recipient of the payment request exceeds a predetermined threshold.

When the payment request is a request for payment, the image can include at least two persons. In those instances, after identifying the at least two recipients, the value included in the payment requests to each of the at least two identified recipients is split between the at least two identified recipients.

In some instances, the operations may include receiving a confirmation of the payment request from the at least one identified recipient and facilitating the payment between the user initiating the payment request and the at least one identified recipient. In those instances, and in response to facilitating the payment, the image may be modified by embedding information related to the completed payment request within the image.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
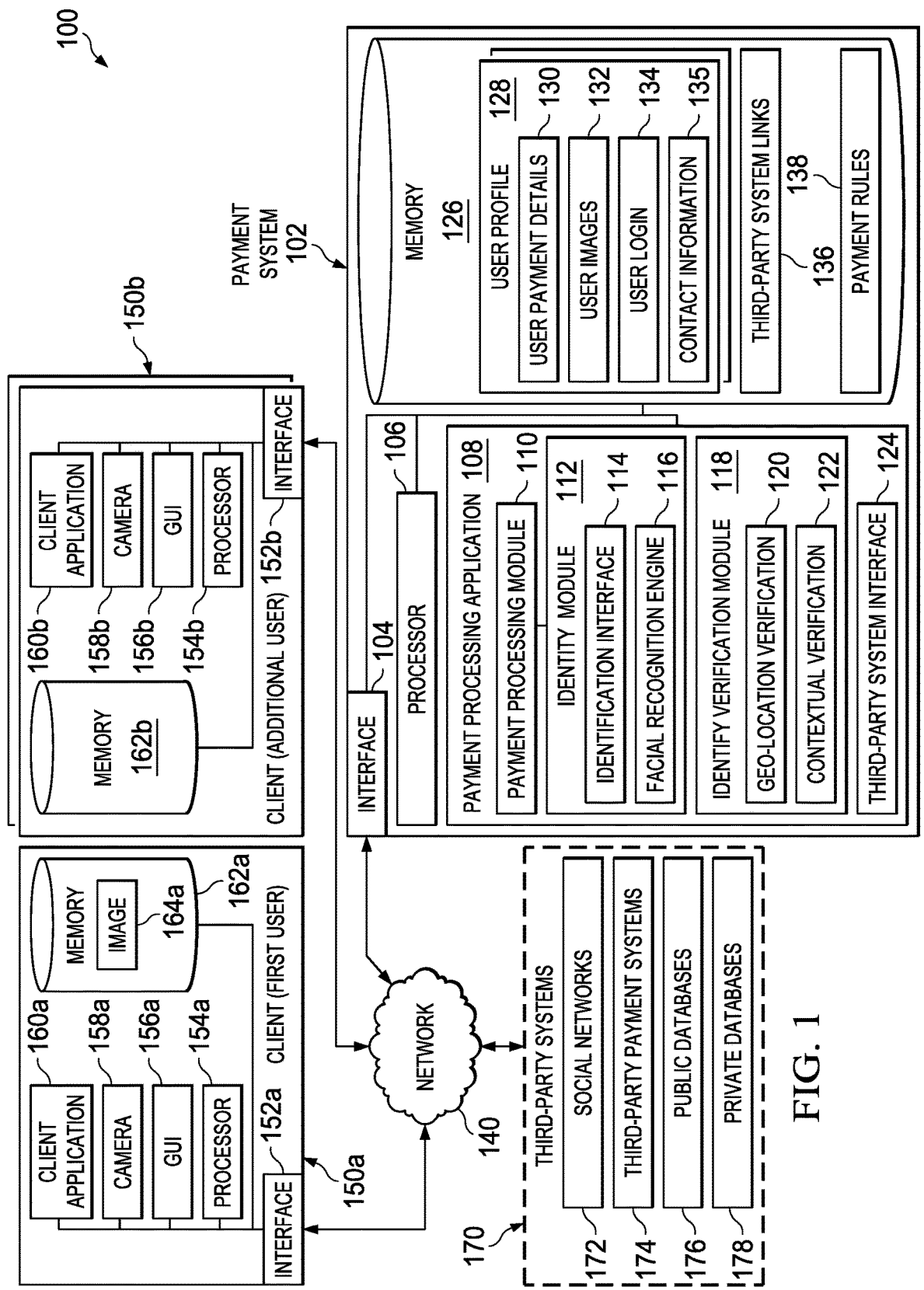
FIG. 1 is a block diagram illustrating an example system for sending payment requests to one or more persons or entities based on images in which the persons or entities appear.

The present disclosure describes a system that can receive an image associated with a payment request. The system processes the image, e.g., using facial and image recognition, to identify one or more persons included in the received image. The system can then identify contact information associated with the identified persons and send requests to either receive or submit payments in response to the payment request.

From a user's perspective, the user can request payment from other persons another or initiate a payment to be sent to others using images alone to initiate such payment requests. The initiating user may capture the person to whom the payment request is to be sent in an image using a camera integrated into their mobile device or can identify a pre-existing image. Using that image, along with details of the monetary value to be sent or requested to be received, the initiating user can request payment. Instead of providing details on the recipients included in the image, the system can use advanced image analysis to identify the persons included in the image and direct payment accordingly.

In general, the present disclosure describes a system capable of providing a simpler and easier solution to users initiating a payment request, by providing such functionality without requiring a prior relationship to the recipients of the request (i.e., the system works for strangers as well as known associates), without requiring an exchange of money between present devices, and allows for delayed payments or repayments (i.e., after initial payment by a single person paying for multiple people). Further, verification techniques used during the facial recognition process can reduce errors in the process to help avoid false claims and requests for repayment. In some instances, scanned facial and other biometric information may be provided to and/or obtained by a financial or health institution as an authentication mechanism. That information can later be used to verify the identity and/or accounts of persons included in an image before facilitating transfers of funds.

Several helpful use cases explain the additional benefits of such a system. In a first case, a transfer of monetary funds (or other suitable value) can be performed between two or more people. For example, in a person-to-person transaction, Person A may wish to pay Person B using an implementation of the described system. Person B may not have a mobile phone, while Person A may not have cash or a check. Person A can take a picture of Person B using Person A's mobile device and, using a suitable mobile application on Person A's mobile device, indicate that a particular amount should be sent to Person B. Instead of Person B requiring a mobile device, or generally accepting mobile charges, the implemented system receives the photo/image and, using facial recognition techniques, identifies contact information associated with Person B. The system can send Person B a notification of a request to send funds to Person B. In some instances, Person B can accept the transfer prior to the value being sent. In response to identifying Person B and confirming the contact information, the system can use traditional or specifically implemented payment processing techniques to process the payment from Person A to Person B.

In a second case, a group of friends or acquaintances may attend a dinner or event, such as a friend's birthday. Instead of splitting the bill multiple ways at the time, the participants may elect to have fewer than all participants pay there, while later collecting money from the remaining group to cover each's fair share. During the festivities, a waitress, third party, or participant may take a picture of one or more of the group. Using the photo of the group, and identifying a portion of the bill to be split, an implementation of the system can identify the persons in the photo using facial recognition, connect those participants to their contact and account information, and request payment as needed. One or more of the participants, such as the person whose birthday that is being celebrated, or those who were able to pay at the time, may be excluded as directed by the requesting user. In some instances, specific faces may be selected at the initial phase to keep certain persons from being included in the payment request. Various verification techniques can be used to ensure that the persons identified in the photo. In some cases, the photo recognition may be based on one or more systems, services, or repositories outside of the payment processor or entity providing the solution. For example, photo recognition may be used via one or more social networks, search engines, public or private databases, as well as others. In some instances, the photo recognition may be based on a dedicated facial recognition database provided by the payment processor. In some instances, additional sources may be used based on incomplete or unavailable results from a primary data source.

Turning to the illustrated embodiment, FIG. 1 is a block diagram illustrating an example system 100 for sending payment requests to one or more persons or entities based on photos or images in which the persons or entities appear. As illustrated in FIG. 1, system 100 is a client-server system capable of sharing images across network boundaries for the purposes of making or requesting payments, analyzing those images to identify one or more persons included within the photos, and communicating with those identified persons to coordinate payments between the initiating user and the one or more persons. Specifically, system 100 includes or is communicably coupled with a payment system 102, a first client 150a and one or more additional clients 150b, a network 140, and one or more third-party systems 170. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, payment system 102 may be any computer or processing device such as, for example, a blade server, general-purpose personal computer (PC), Mac®, workstation, UNIX-based workstation, or any other suitable device. Moreover, although FIG. 1 illustrates a payment system 102, payment system 102 can be implemented using two or more systems, as well as computers other than servers, including a server pool. In other words, the present disclosure contemplates computers other than general purpose computers, as well as computers without conventional operating systems. Further, illustrated payment system 102, clients 150a/b, and the third-party systems 170 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, the payment system 102 is used to receive and process payment requests. The payment system 102 illustrated herein is described in terms of the operations related to photo-based payment requests. However, the payment system 102 may, in some implementations, be a larger system providing payment operations related to credit cards, banking, and other types of payments in addition to photo-based payment requests. In other implementations, the payment system 102 may be separate from traditional payment systems, and may use processing power and functionality associated with those traditional systems to perform the actual payment processing, wherein the photo recognition and payment requests sent are managed by the illustrated payment system 102.

The illustrated payment system 102 can receive payment requests from one or more clients 150, where payments requests, whether requesting payment from or to another, include one or more photos each including one or more persons or entities associated with the payment request, as well as an amount or value to be associated with the requested payment. The payment system 102 has, or is associated with, functionality for determining the identity of the persons or entities included in the one or more photos, identifying account and/or contact information associated with the identified persons or entities, and delivering the payment request to those identified persons or entities based on the account or contact information. In some instances, the payment system 102 may automatically debit or credit an account associated with the identified person or entity without the need for acceptance or confirmation from the recipient, or additionally or alternatively, the requesting person.

The payment system 102 may, in some implementations, manage the operations to be performed while leveraging available technologies, web services, existing knowledge bases, and other outside capabilities to perform some or all of the operations. For example, external photo recognition databases may be accessed, such as those associated with social networks, e.g., Facebook, LinkedIn, etc. Additionally, information from third-party systems may be useful in verifying particular photo determinations, such as location data from a user's mobile device that can be used to verify the location of the recipient matches or coincides with the location of the photo. Alternatively, information from social networks, such as check-ins and other location- and timing-related information, can be used to verify the determinations of the facial recognition system.

As illustrated, the payment system 102 includes an interface 104, a processor 106, a payment processing application 108, and memory 126. In general, the payment system 102 is a simplified representation of one or more systems and/or servers that provide the described functionality, and is not meant to be limiting, but rather an example of the systems possible.

The interface 104 is used by the payment system 102 for communicating with other systems in a distributed environment—including within the environment 100—connected to the network 140, e.g., clients 150, one of the third-party systems 170, and other systems communicably coupled to the network 140. Generally, the interface 104 comprises logic encoded in software and/or hardware in a suitable combination and operable to communicate with the network 140. More specifically, the interface 104 may comprise software supporting one or more communication protocols associated with communications such that the network 140 or interface's hardware is operable to communicate physical signals within and outside of the illustrated environment 100.

As illustrated in FIG. 1, the payment system 102 includes a processor 106. Although illustrated as a single processor 106 in FIG. 1, two or more processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the payment system 102. Specifically, the processor 106 executes the algorithms and operations described in the illustrated figures, including the operations performing the functionality associated with the payment system 102 generally, as well as the various software modules (e.g., the payment processing application 108), including the functionality for sending communications to and receiving transmissions from clients 150 and third-party systems 170.

The illustrated payment system 102 also includes memory 126, or multiple memories 126. The memory 126 may include any memory or database module and may take the form of volatile or non-volatile memory including, without limitation, magnetic media, optical media, random access memory (RAM), read-only memory (ROM), removable media, or any other suitable local or remote memory component. The memory 126 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the life insurance platform 102. Additionally, the memory 126 may store any other appropriate data, such as VPN applications, firmware logs and policies, firewall policies, a security or access log, print or other reporting files, as well as others. For example, memory 126 can store user profile information 128 associated with one or more users of the photo payment system. The user profile information 128 can be used to associate pictures and identified persons with one or more accounts and contact information.

As illustrated, the user profile information 128 may include information on a plurality of users and can include user payment details 130, user images/photos 132, user login information 134, and user contact information 135. The user payment details 130 may provide information related to one or more bank accounts, credit card accounts, or other payment information, including online payment accounts. The user payment details 130 can allow the system and the payment processing application 108 to access and update accounts with transactions performed using the system 100. For example, in response to a first user submitting a payment request to pay a second user, the user payment details 130 from the first user's profile can be used to fund the transaction. Similarly, the user payment details 130 from the second user's profile can be used to receive the transaction. In some instances, the user payment details 130 may be associated with an online account. In those instances, the user login information 134 may be used to access that account if such access is needed. The user login information 134 may also be used to access one or more accounts related to a particular user, such as a social network, mobile carrier, photo site, or others. In instances where the user is not associated with any login information or payment details, the system 102 may contact the user to register a new account, where necessary.

The user images 132 may be a collection of images (e.g., photos) associated with a particular user. The user images 132 may include images in which the particular user is present, as well as images submitted by the particular user for use in a prior payment request. New images associated with the user can be added to the repository for later use. In some instances, the analysis of particular images may require the determination of a person's identity using external facial recognition services. In those instances, images from the external source may be imported into the user images 132 repository, if allowed by the user. This may enhance and increase the speed of the payment system. The images used in the present disclosure may be in or more file formats, including but not limited to JPEGs (Joint Photographic Experts Group), GIFs (Graphic Interchange Format), TIFFs (Tagged Image File Format), RAW (raw image formats), and PNG (Portable Network Graphics). In some instances, metadata associated with the images can be included within the file (e.g., via headers) or associated with the file.

The contact information 135 of a user can be used to determine how to contact the user when a new payment request associated with the user is received. In some instances, the contact information 135 may be similar to the user payment details 130, or may be determined based on the user payment details 130. The contact information 135 may be retrieved or identified based on the location from where the image recognition was made. For example, LinkedIn, Facebook, or other online profiles may be searched as one of the external sources. In those instances, contact information from those profiles and accounts may be used to contact the particular match and can be imported into the payment system 102, as appropriate.

Some or all of the information associated with the user profile 128 can be provided by the user corresponding to the user profile 128. The user can initially set up the user profile 128 to include the relevant information, such as when a first payment request is received, or upon sending the first payment request.

In addition to the user profile 128, memory 126 includes a set of third-party system links 136 and payment rules 138. The third-party system links 136 can include links and information associated with the one or more third-party systems 170 used to assist in the image recognition-based payment process. This information can include details on one or more application programming interfaces (APIs) associated with the third-party systems 170, login information to particular databases and/or repositories, and procedural information and instructions for using those systems. Payment rules 138 include a set of rules and algorithms defining how the payment processing application 108 performs, including rules related to particular orders in which the internal and external modules and systems are used or employed during the image recognition-based payment process. In some instances, at least a portion of these rules may be configurable, such that an authorized individual can modify the performance of the payment system 102.

As noted, the payment system 102 includes the payment processing application 108. The payment processing application 108 represents an application, set of applications, software, software modules, or combination of software and hardware used to manage the image recognition-based payment request process of the payment system 102. In the present solution, the payment processing application 108 can perform operations including receiving images from clients 150 associated with a payment request, analyze the photo to identify at least one person or entity included in the image, verify the person based on additional information to ensure the correct recipient of the payment request, and interface with one or more external sources when additional information is necessary. Further, upon identifying and determining information associated with persons or entities within the image, the payment processing application 108 can cause the payment request to be processed and completed, as needed. The payment processing application 108 can include and provide various functionality to assist in the management and execution of the image recognition-based payment process. As illustrated in FIG. 1, the payment processing application 108 includes a payment processing module 110, an identity module 112, an identity verification module 118, and a third-party system interface 124. Additional modules and functionality may be included in alternative implementations.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The payment processing module 110 performs operations associated with processing payments after identities are verified and payment requests are received and acknowledged. The payment processing module 110 can use the user payment details 130 of each user in a particular transaction to debit and credit accounts, as needed. The payment processing module 110 may be part of a pre-existing payment processing system, such as those managed by Visa, MasterCard, PayPal, or any other transactional provider. Alternatively, the payment processing module 110 may be associated with one or more financial institutions and can provide operations for the transactions. The operations performed in actually performing the payment processing may be similar to those in traditional payment processing, or they may be specifically designed for the image recognition-based payment process. Still further, the solution could be implemented and used with person-to-person (P2P) transfers and wires as part of the payment processing operations.

The identity module 112 performs operations for identifying persons included in the one or more images associated with a payment request. The identity module 112 can determine, using the received image, a number of persons for whom to perform an identification on from the image. In some instances, the submission of the image from the client 150 may include an indication of one or more persons or entities within the image to be omitted from the facial recognition (e.g., persons not associated with the payment request). For the remaining persons, concurrent, simultaneous, or serialized facial recognitions can be performed. As illustrated, the identity module 112 includes a facial recognition engine 116. The facial recognition engine 116 can perform facial recognition on the one or more persons associated with the payment request. The facial recognition engine 116 can perform any suitable type of facial recognition (e.g., traditional, 3-dimensional, or skin texture analysis, among others), using one or more databases, for example, the user images 132. Additionally, the identity module 112 includes an identification interface 114 for interacting with one or more external facial recognition systems, one or more facial or image databases, and one or more other external sources as appropriate. Using the identification interface 114, as well as the third-party system interface 124, one or more external services and knowledge bases can be used to perform or assist in the facial recognition. Such external systems and sources may be publicly or privately available in different implementations. After operating, the identity module 112 can return one or more potential matches from the one or more images. The operations may be able to handle and interpret both compressed and uncompressed images. In situations where an error arises or the image cannot be processed and person(s) identified (e.g., based on image size, image quality, image orientation, person making a manipulated or distorted face), then the system can prompt the user to re-take the photo, provide additional information, or provide alternative methods to identify the person(s) in the image (e.g., email address, relevant information, etc.)

The identity verification module 118 performs verification operations to reduce misidentifications of persons or entities by the identity module 112. In some instances, the identity verification module 118 may be optional and may include various alternative methods of verifying or reducing misidentifications. The illustrated identity verification module 118 includes a geo-location verification module 120 and a contextual verification module 122. The geo-location verification module 120 can be used to verify that the persons identified by the identity module 112 were physically located in a position at the time the one or more images were taken. Each digital image may include or be associated with a set of metadata providing information identifying the owner of the image, copyright and contact information, the camera or device that created the file, exposure information, and other descriptive information related to the digital image. Included in the descriptive information may be geo-location data from where the image was taken or created, such as a longitude and latitude received from a global positioning satellite. In some instances, the geo-location verification module 120 may use such location metadata from the digital file to verify that the one or more persons identified by the identity module 112 were located at or near the location at which the image was taken. Such verifications can be performed by accessing location information on a device associated with the recipient and confirming that the recipient was near the location. Alternatively, information may be retrieved or confirmed by a mobile carrier providing service to the recipient's device (with permission from the user), location information reported back by one or more apps associated with the recipient's mobile device, or by other suitable information. If the geo-location verification module 120 confirms the person was in a similar location to that of where the digital image was taken as determined by the digital image's metadata, the payment request may be verified.

The contextual verification module 122 may perform other verifications of the payment request. The contextual verification module 122 may also use the metadata associated with the digital image file. Instead of comparing the geo-location of the recipient, the contextual verification module 122 may use contextual information to compare with the digital file's location of origin. For example, the contextual verification module 122 may be capable of accessing one or more social networks. Using check-ins, statuses, and other information provided by the recipient, the contextual verification module 122 can determine whether the recipient was located near the location of origin at the time of the image. If the payment processor and the identity verification module 118 are closely aligned, the location in the digital file may be compared to one or more recent purchases at establishments near the time of image to confirm the verification. Additional contextual verifications may be based on relative friendships, relationships, and social circles of the persons involved in the transaction. A relative relationship, even if not direct, between the persons may indicate a higher probability of verification. In some instances, a threshold level of relationship (i.e., a second-degree relationship, where friends are held in common) may be required for verification. If the identified person has no relation to the person initiating the payment request, the verification may indicate that the identification is less likely, and other verifications may be needed. In some implementations, time-based verifications may be placed on received images. For example, some systems may implement a time verification identifying an age of an image (from creation of the file, the date the image was created, etc.) and determining whether the image is older than a threshold time limit. This may be used to prevent potentially fraudulent requests, untimely requests, and requests that may not be correct. For example, a time limit of three (3) days may be imposed. If an image file is determined to be four (4) days old, the system may reject or end the payment request. Different time limits may be imposed, such as a week, 24 hours, or any other suitable time. Such restrictions and verifications can be used together or separately, as implemented.

Once the identity of the persons or entities in the image is verified, the information can be provided back to the payment processing module 110 to continue and facilitate the payment request.

The third-party system interface 124 provides functionality and connectivity for the payment processing application 108 to access the one or more third-party systems 170. The third-party system interface 124 can provide defined or dynamic connections to the external systems via network 140, using those connections to provide additional information and processing power to the payment system 102 to perform its prescribed operations.

Network 140 facilitates wireless or wireline communications between the components of the environment 100 (i.e., between the payment system 102 and clients 150 and/or the third-party systems 170, between clients 150, and among others), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The third-party systems 170 can include any suitable external systems, functionality, or operations that assist the payment processing application 108 in the image recognition-based payment process. As illustrated, the third-party systems 170 include one or more social networks 172, third-party payment systems 174, public databases 176, and private databases 178. The one or more social networks 172 can be used for facial recognition and image identification as well as via location and contextual verification. The third-party payment systems 174 can be any existing systems used by the payment processing application 108 and its payment processing module 110 to effectuate processing of the payment. The public and private databases 176, 178 may include image and facial recognition databases used by public and private entities. For example, the public databases 176 may include governmental databases or other openly available sources of facial recognition-related data. The private databases 178 may be those managed by private sources, such that membership or access is provided to the payment system 102 in exchange for payment or other consideration. In some instances, external facial recognition engines may be used.

Clients 150 (150a and 150b) may be any computing devices operable to connect to or communicate with payment system 102, other clients 150, or other components via network 140, as well as the with the network 140 itself, using a wireline or wireless connection, and can include a desktop computer, a mobile device, a tablet, a server, or any other suitable computer device. In general, client 150 comprises an electronic computer device operable to receive, transmit, process, and store any appropriate data associated with the environment 100 of FIG. 1.

As illustrated, clients 150 include an interface 152, a processor 154, a graphical user interface (GUI) 156, a camera 158, a client application 160, and memory 162. The interface 152 and processor 154 may be similar to or different than the interface 104 and processor 106 described for payment system 102. In general, processor 154 executes instructions and manipulates data to perform the operations of the client 150. Specifically, the processor 150 executes the algorithms and operations described in the illustrated figures, including the operations performing the functionality associated with the client application 160 and camera 158.

Client 150 executes a client application 160 operable to prepare and submit payment requests, where the payment request includes submitting one or more images 164 to the payment system 102. The images 164 may be taken by an integrated camera 158 on the client 150, or the image may be taken from another camera apart from the client 150 or downloaded or obtained from an external location. Client application 160 may be a web site, portal page, a dedicated mobile application, or other software. The client application 160 may include integrated camera software for taking images with camera 158 and/or importing images.

Client 150 can also include a graphical user interface (GUI) 156. The GUI 156 interfaces with at least a portion of the environment 100 for any suitable purpose, including generating a visual representation of a web browser and/or the client application 160. In particular, the GUI 156 may be used to view and navigate various web pages located both internally and externally to environment 100, as well as to view and navigate through information accessed by the client application 160, such as information stored at or associated with the payment system 102. Generally, the GUI 156 provides the particular user with an efficient and user-friendly presentation of data provided by or communicated within the system. The GUI 156 may comprise a plurality of customizable frames or views having interactive fields, pull-down lists, and buttons operated by the user. For example, the GUI 156 may provide interactive elements that allow a user to view or interact with images to identify images for requesting payment and for sending said requested payment to the payment system 102. The GUI 156 may present information associated with the client application 160 for viewing and interaction. In general, the GUI 156 is often configurable, supports a combination of tables and graphs (bar, line, pie, status dials, etc.), and is able to build payment requests. Therefore, the GUI 156 contemplates any suitable graphical user interface, such as a combination of a generic web browser, intelligent engine, and command line interface (CLI) that processes information in the platform and efficiently presents the results to the user visually.

The illustrated client 150 is intended to encompass any computing device such as a desktop computer, laptop/notebook computer, mobile device, smartphone, personal data assistant (PDA), tablet computing device, one or more processors within these devices, or any other suitable processing device. For example, the client 150 may comprise a computer that includes an input device, such as a keypad, touch screen, or other device that can accept user information, and an output device that conveys information associated with the operation of the client application 160 or the client 150 itself, including digital data, visual information, or a GUI 156, as shown with respect to the client 150.

Client 150 also includes memory 162, which may be similar or different to memory 126. Memory 162 includes at least one image, either as captured by camera 158 or that is imported or otherwise stored on the client 150.

As illustrated, client 150a may be associated with a first user initiating the payment request, where image 164a is submitted, using client application 160a, to the payment system 102. In this example, the client application 160a may be a dedicated mobile application associated with the payment system 102 and meant to provide image-based payment requests. Client 150b may be associated with one or more additional users who are receiving the payment request (i.e., recipients) after the payment system 102 performs the facial recognition and association with the corresponding users. The additional clients 150b may, e.g., via client application 160b, receive a notification of the payment request. If payment is requested from the client 150b, the client application 160b may allow the corresponding users to accept and pay the requested amount. If payment is to be sent to the users associated with clients 150b, then a notification message may be received. In some instances, no action may need to be taken to perform the transaction when payment is being sent to the client 150b.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Further, while the facial recognition and analysis is managed at the payment system 102 in FIG. 1, alternative implementations may perform at least some of the recognition and analysis at the client 150, or alternatively, at one or more systems and/or services external to the payment system 102, such as third-party facial recognition and verification services (e.g., governmental services, private services, etc.).

Figure 2:
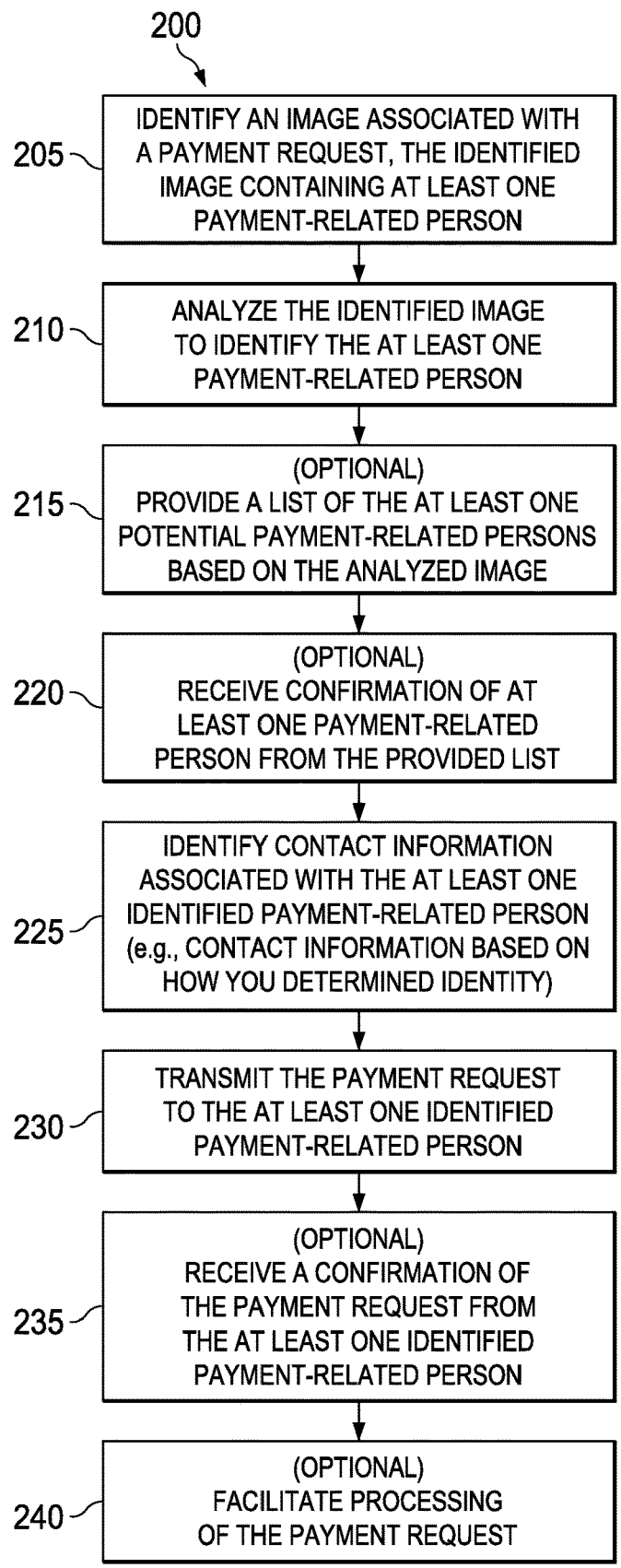
FIG. 2 is a flowchart of an example operation related to sending payment requests to one or more persons or entities based on images in which the persons or entities appear.

FIG. 2 is a flowchart of an example operation 200 related to sending payment requests to one or more persons or entities based on images or images in which the persons or entities appear. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate.

At 205, an image associated with a payment request is identified, wherein the identified image contains at least one payment-related person or entity in the image. The image may be a photo in some instances. The payment request and image may be received from a mobile device. In some instances, the mobile device may have taken the image with a camera integrated with the mobile device, while in other instances, the mobile device may identify a pre-existing or a prior-taken image to be included with the payment request. In some instances, the payment request may be received from a non-mobile device, such as a desktop computer. The identified image may be an image downloaded to or saved on the non-mobile device. In some instances, one or both of the mobile and non-mobile devices may have one or more applications capable of identifying the image and/or sending the payment request. The operations of method 200 may be performed, at least in part, at the mobile or non-mobile device, as well as at a system physically remote from the mobile or non-mobile devices.

Each payment request includes a value for which payment is requested. For example, the value in a first payment request may be an amount identified using monetary funds, such as dollars, euros, or another denomination. In other instances, the value requested may be a non-monetary or non-traditional monetary amount, such as credits, goods, or services. The credits may include minutes or data from a cellular or wireless provider plan, Bitcoins or another crypto-currency, as well as any other suitable credit. In some instances, the value included in the payment request may be a good or service that cannot be easily transferred electronically, such that the actual transaction and transfer to complete the payment request may be performed manually via face-to-face interaction or over a communications medium, either providing the goods or services directly, by shipping goods, by performing services remotely, or by shipping goods from one to another.

At 210, the identified image is analyzed to identify the at least one payment-related person. In some instances, one or more persons in the identified image may be omitted from a payment request facial recognition determination. For example, an initiating user can manually identify particular faces or persons within the image who should not be included in the analysis. During the analysis, those persons and their faces will not be considered by the analysis. For those remaining persons to be analyzed, facial or other recognition processes can be performed to identify those included in the payment request. In some instances, the persons may not be known to the initiating user, either within their personal contacts or based on prior relationships (e.g., via social network). In those instances, the system can still perform operations capable of determining the recipient based only on the identified image. The details of the analysis may vary, although one example set of operations is illustrated in FIG. 3.

Figure 3:
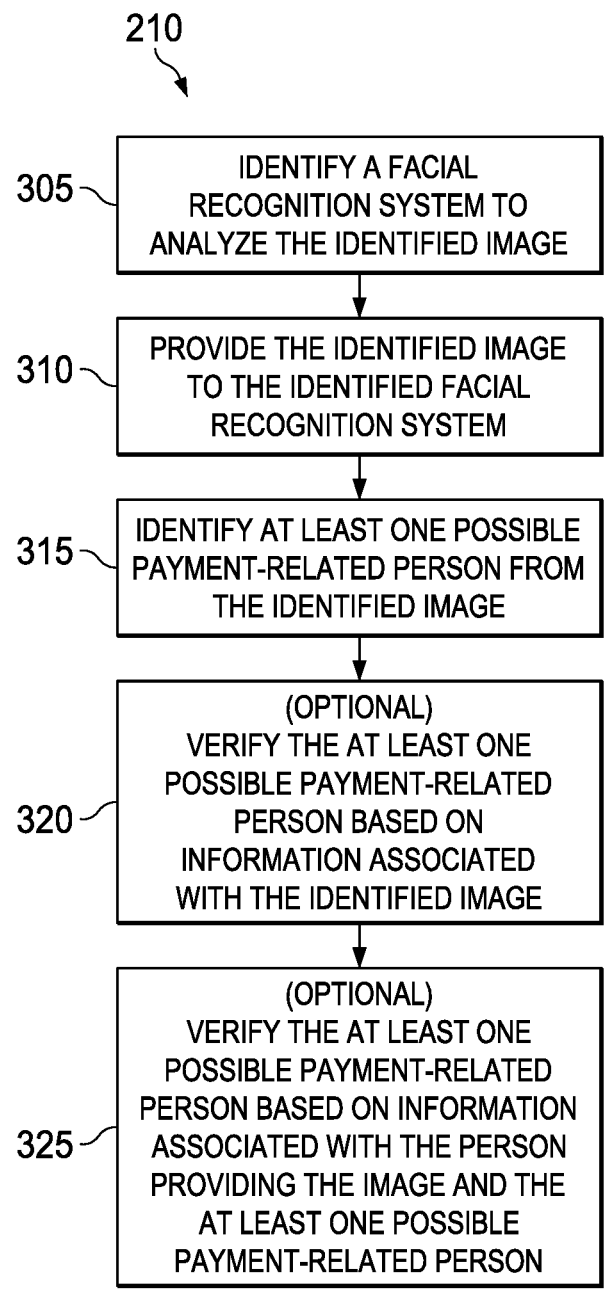
FIG. 3 is a flowchart of an example operation related to analyzing and verifying potential identities of persons included in the images.

Specifically, FIG. 3 is a flowchart of an example operation 210 related to analyzing and verifying potential identities of persons included in the images. While example operations are shown, the actual operations may vary based on particular implementations of the system and operations.

At 305, a facial recognition system for analyzing the identified image is identified. In some instances, the facial recognition system may be local to a payment processor managing the analysis, or the facial recognition system may be local to a mobile device initiating the payment request. In other instances, the facial recognition system may be an external service or source, such as a social network or third-party service. In some instances, more than one facial recognition system may be used concurrently or sequentially. For example, a local system may be used, where an external system is then used if no reliable matches are returned by the local system.

At 310, the identified image is provided to the identified facial recognition system. At 315, at least one possible payment-related person from the identified image is identified. In instances where the identified image includes multiple (and non-omitted) persons, the process may be performed multiple times before completing.

At 320 and 325, the at least one identified possible payment-related person may be, optionally, verified. The operations of 320 and 325 describe several possible verification techniques, although numerous other techniques may also be used, where appropriate and available. Some, all, alternative, or no verification techniques may be implemented in different situations.

At 320, a verification of at least of the identified possible persons can be performed based on information associated with the identified image. For example, the identified image may be a data file having a set of metadata associated with it, including a location where the image was created or where a photo in the image file was taken, as well as a time the image was taken. In some instances, this, or other information associated with the image (e.g., image metadata), can be used to verify, or support, the identity of the identified possible person. In one example, the location of the identified person at the time of the image may be determined and compared to the location of the image. In some instances, information from or associated with a mobile device of the identified person can be used to determine the person's location at the image time. Social network check-ins, status updates, and messaging information may also be used to determine location. Still further, and in addition to other suitable options, purchase history from a credit card, automated teller machine (ATM), or other external service may also be used to verify location. Alternatively, location information embedded in or associated with the identified image, such as GPS-based metatags or other metadata, may also be used to verify location.

At 325, a verification of the at least one possible persons can be performed based on the person initiating the payment request and providing the image. Specifically, the initiating user's current and/or prior locations may be used to cross-reference the current and/or prior locations of the identified potential person to determine whether such locations overlapped. Similarly, even if the image does not include location metadata, information from a social network tagging both the initiating person and the identified potential person at a common location or event may provide sufficient verification. In some instances, such persons may be separately tagged or checked-in at a particular location within relatively close times. In those instances, such information may act as a verification that the identified person was present and a potential payment request recipient.

The verifications required to confirm the identified persons may vary in each implementation, and per image and/or payment request. For example, if the initiating user and the identified possible person are related via social networking, particularly to a threshold degree, such verifications may not be used. Conversely, where no known relationship between the initiating user and the potential person are identified, significant verifications may be necessary to confirm the payment request.

Returning to FIG. 2, at (optional) 215, a list of the potential payment-related persons identified from the image may be provided to the initiating user. In one instance, the image of the person from a facial database as determined during the analysis can be compared to the person from the identified image. One or more potential persons may be included in the list. At (optional) 220, confirmation of the at least one identified possible person from the provided list may be received.

At 225, contact information associated with the at least one identified person is identified. In some instances, the information may be known and/or obtained via the same facial recognition technique used (e.g., via the social network). Contact information may be used to send the payment request to the identified recipient as needed. In some instances, the contact information used for a particular person would be based on the online location from which the person was identified. If the person was identified using a local image or facial database, local contact information may be used. Alternatively, if the facial recognition identified the person based on a social network, the contact information provided there may be used. Still further, if the analysis process identified the person based on a professional profile page, contact information extracted from that location may be used.

At 230, the payment request can be transmitted to the at least one identified person via the identified contact information. At (optional) 235, a confirmation of the payment request from the at least one identified person may be received. In some instances, no confirmation may be necessary, such as where the person is known, along with bank or other account information, and the payment request relates to a request to pay the identified person. In those instances, no confirmation may be necessary before depositing the value into the identified person's account.

At optional 240, the processing of the payment request may be facilitated in response to a confirmation to perform the payment processing, or where no confirmation is needed, upon transmitting the payment request. Method 200 can use any suitable payment processing functionality or service, including those of Visa, MasterCard, PayPal, and others.

Figure 4A:
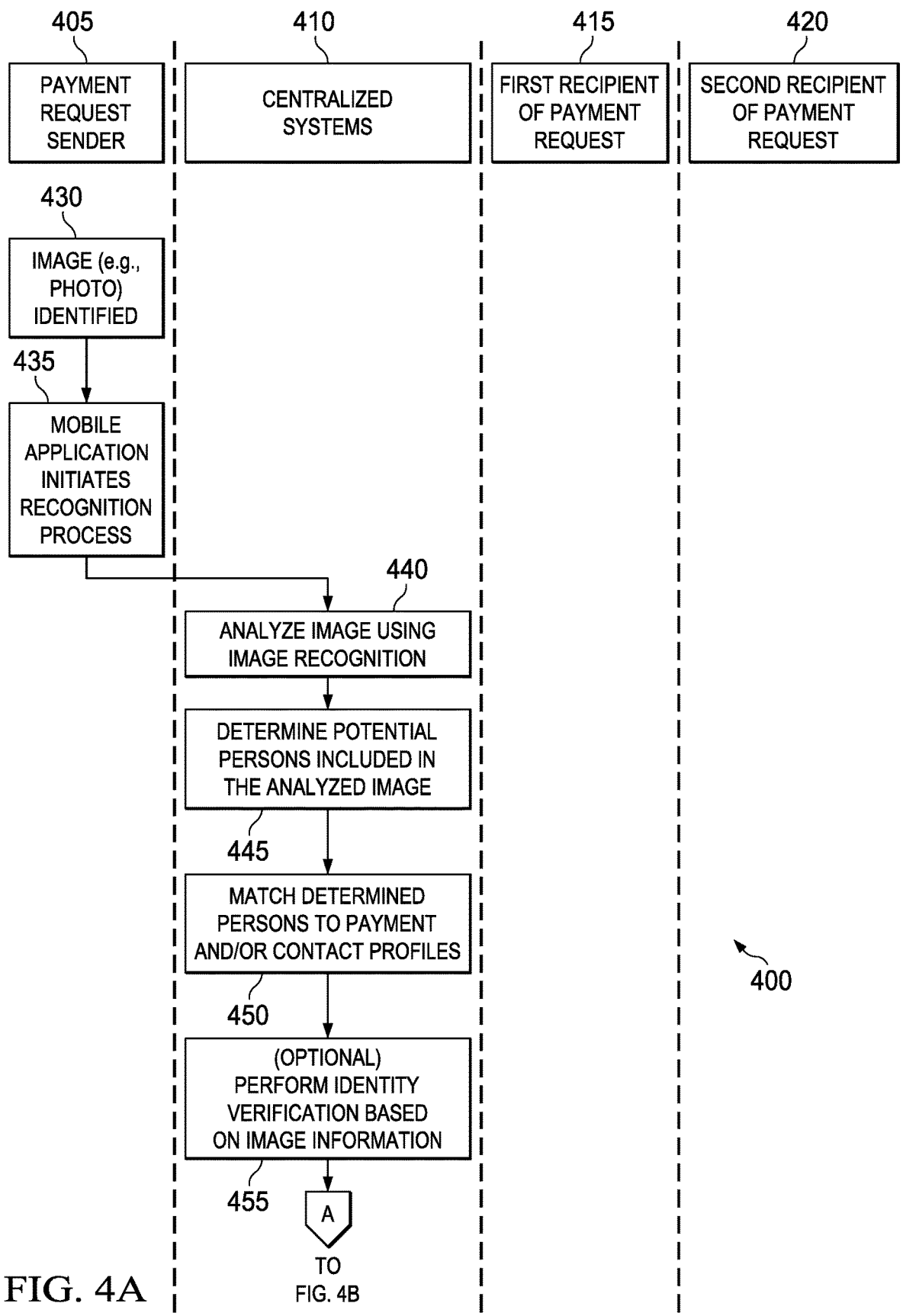
FIGS. 4A and 4B are a combined swim-lane diagram illustrating example operations related to actions for sending payment requests to one or more persons or entities based on images in which the persons or entities appear.
Figure 4B:
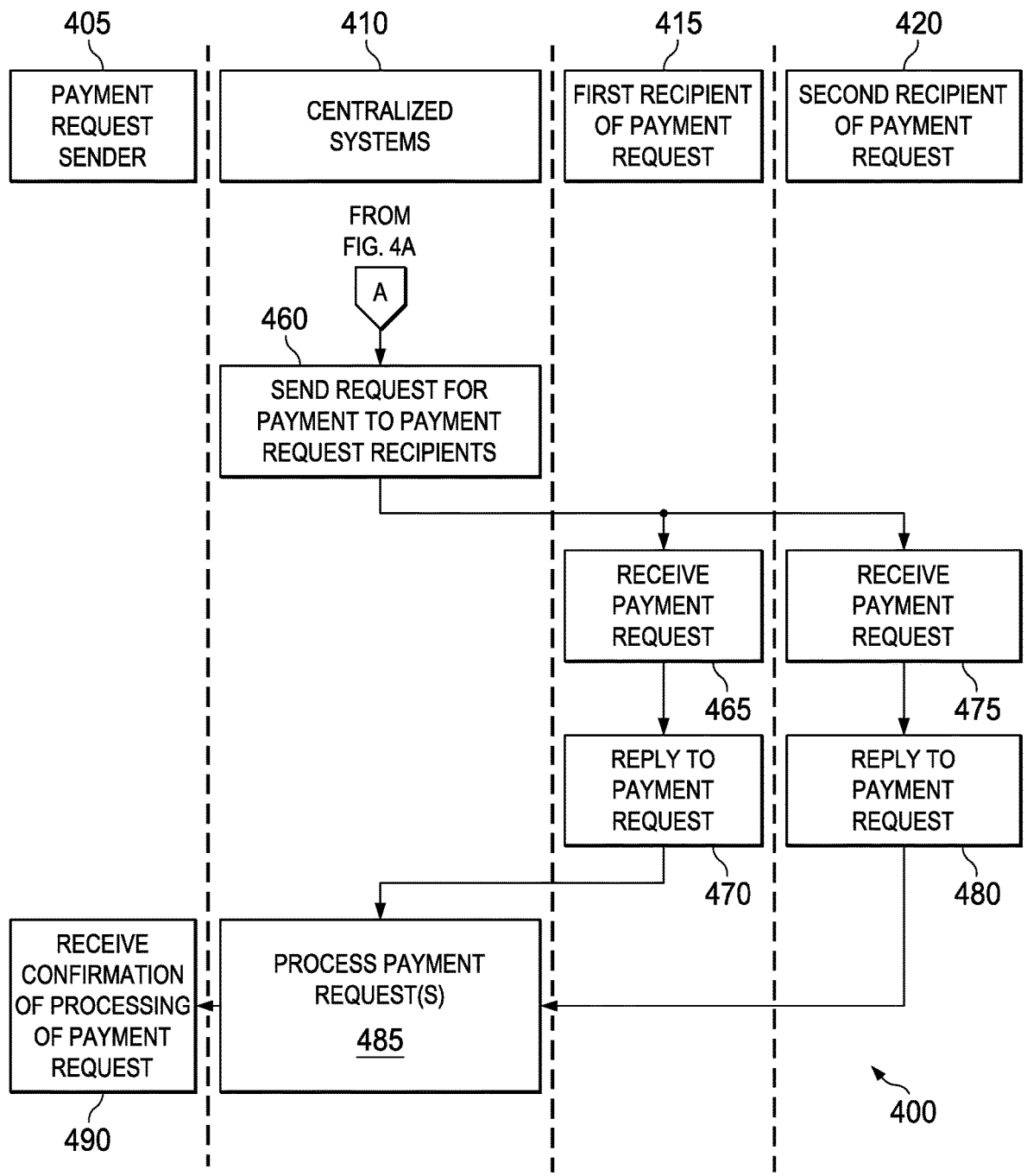

FIGS. 4A and 4B are a combined swim-lane diagram 400 illustrating example operations related to actions for sending payment requests to one or more persons or entities based on images in which the persons or entities appear. The payment request sender 405, the first recipient of the payment request 415, and the second recipient of the payment request 420 may be associated with one or more mobile devices in this example, where the persons can perform the operations at the mobile devices. Centralized systems 410 can represent the payment system 102 and any third-party systems 170, as well as other or alternative systems to perform the described operations.

At 430, the payment request sender can identify (e.g., capture or select) an image to use when performing a image-based payment process. At 435, a mobile application associated with the image-based payment process can initiate the recognition process. In general, the mobile application may only need to identify a single picture and a value to be requested (whether to pay another or requesting payment from another). The sender may also identify one or more faces/persons included in the image to omit from the analysis via the mobile application.

At 440, the image is analyzed using image and/or facial recognition, and at 445, determines one or more potential persons included in the analyzed image. At 450, one or more persons are matched to the image, and their corresponding contact information/profile and/or payment information is determined. At 455, identity verification of those determined in 445 and 450 may be optionally performed. In some instances, there may be multiple levels of verification based on initial determinations and analysis. For example, verifications may be based on a known relationship between the persons (e.g., via a social network). Depending on the level of relationship, the location and timing of or associated with the image may be compared to information known about the possible persons identified from the image. Additional, and varied, levels of verification can be performed.

At 460, the centralized systems 410 can send a request for payment to the payment request recipients as determined by the analysis operations and, optionally, as verified by the verification operations. The payment requests may be sent via any suitable channel, including as a push notification to a mobile device of the one or more recipients, to email addresses of the one or more recipients, to text addresses of the one or more recipients, to a social network inbox or messaging application of the one or more recipients, among others.

As illustrated, the first (415) and second (420) recipients receive the payment requests at 465 and 475, respectively. At 470 and 480, respectively, the first and second recipients can reply to and/or confirm the payment requests. Such replies may be unnecessary in some instances, such that upon sending the payment notification (or before sending the notification), the payment request can be processed at 485. Upon processing the payment, the centralized systems 410 can send (at 490) a confirmation that the payment request has been processed to the sender 405.

In some implementations, additional operations may be performed upon the image being used to initiate the payment request. For example, once payment is successfully used to facilitate payment, the image can be modifying by embedding one or a series of pixel modifications to the original image, thereby providing and indicated a record of the image being used as payment initiation. Pixel modification can include generic data such as payment amount and/or the date completed. Such information can be provided back to the initiating user by returning the image after completion. Additionally, if the image is stored for use in one of the source databases for facial recognition, the information stored within the image may be used to verify and/or maintain a record of the identified user's prior activities within the payment systems. Still further, by storing a modified version of the original image, future submissions of the original image may be denied outright or result in a notification that the image has previously been used and a transaction completed.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by a processor, the computer-implemented method comprising:
   receiving, by the processor, a payment request including a value and associated with an image file, the image file including images of at least two persons;
   analyzing, by the processor, the image file associated with the payment request to identify at least one recipient of the payment request;
   identifying, by the processor, contact information associated with the at least one identified recipient of the payment request;
   sending, by the processor, the payment request to the at least one identified recipient of the payment request via a destination associated with the identified contact information;
   receiving, by the processor, a confirmation of the payment request from the at least one identified recipient;
   facilitating, by the processor, the payment between a user initiating the payment request and the at least one identified recipient; and
   after facilitating the payment, modifying, by the processor, the image file, wherein modifying the image file comprises embedding at least one pixel modification to the image file indicating a record of the image file being used as a payment request, wherein the modified image file is stored for future comparisons to later received image files associated with later received payment requests, wherein a later submission of a non-modified image file for a later received payment request is flagged during a facial recognition process as being associated with a previous transaction, the flagging resulting in at least one of a denial of the later received payment request or in generating a notification of at least one prior payment request associated with the non-modified image file of the later received payment request; and
   store the modified image file in a memory.

2. The method of claim 1, wherein, in association with the received payment request, an image of at least one person in the image file is indicated to be omitted from the payment request.

3. The method of claim 2, wherein analyzing the image file to identify at least one recipient of the payment request includes performing an automated computer-based facial recognition process on the images of the persons in the image file not associated with an indication to be omitted from the payment request to identify the at least one recipient of the payment request.

4. The method of claim 2, wherein the indication of omission from the payment request is selected by the user initiating the payment request prior to sending the payment request, wherein the user interactively selects, within the image file, the image of at least one person included in the image file for omission.

5. The method of claim 2, wherein the value of the payment request is split between the at least one recipient of the payment request.

6. The method of claim 2, wherein the payment request includes an indication of particular values associated with each image of the persons not associated with the indication to be omitted from the payment request, and wherein sending the payment request to the at least one identified recipient includes sending a payment request for the particular value indicated in association with the corresponding image of each of the at least one identified recipients.

7. The method of claim 6, wherein the indication of the particular values associated with each image of the persons not associated with the indication to be omitted from the payment request is selected by the user initiating the payment request prior to sending the payment request, wherein the user interactively selects, within the image file, the image of at least one person and inputs a particular value to be associated with the payment request for the person corresponding to the image.

8. The method of claim 1, wherein the payment request including the image file is received from a mobile device associated with the user initiating the payment request.

9. The method of claim 1, wherein the payment request is a request for payment from at least one of the persons included in the image file.

10. A non-transitory, computer-readable medium storing computer-readable instructions executable by a computer including at least one processor, the computer-readable instructions configured, when executed by the at least one processor, to:
   receive a payment request including a value and associated with an image file, the image file including images of at least two persons;
   analyze the image file associated with the payment request to identify at least one recipient of the payment request;
   identify contact information associated with the at least one identified recipient of the payment request;

send the payment request to the at least one identified recipient of the payment request via a destination associated with the identified contact information;

receive a confirmation of the payment request from the at least one identified recipient; and facilitate the payment between a user initiating the payment request and the at least one identified recipient; and after facilitating the payment, modify the image file, wherein modifying the image file comprises embedding at least one pixel modification to the image file indicating a record of the image file being used as a payment request, wherein the modified image file is stored for future comparisons to later received image files associated with later received payment requests, wherein a later submission of a non-modified image file for a later received payment request is flagged during a facial recognition process as being associated with a previous transaction, the flagging resulting in at least one of a denial of the later received payment request or in generating a notification of at least one prior payment request associated with the non-modified image file of the later received payment request; and store the modified image file in a memory.

11. The computer-readable medium of claim 10, wherein, in association with the received payment request, an image of at least one person in the image file is indicated to be omitted from the payment request, wherein the indication of omission from the payment request is selected by the user initiating the payment request prior to sending the payment request, wherein the user interactively selects, within the image file, the image of at least one person included in the image file for omission.

12. The computer-readable medium of claim 11, wherein the payment request includes an indication of particular values associated with each image of the persons not associated with the indication to be omitted from the payment request, and wherein sending the payment request to the at least one identified recipient includes sending a payment request for the particular value indicated in association with the corresponding image of each of the at least one identified recipients.

13. The computer-readable medium of claim 11, wherein analyzing the image file to identify at least one recipient of the payment request includes performing an automated computer-based facial recognition process on the images of the persons in the image file not associated with an indication to be omitted from the payment request to identify the at least one recipient of the payment request.

14. The computer-readable medium of claim 11, wherein the value of the payment request is split between the at least one recipient of the payment request.

15. The computer-readable medium of claim 10, wherein the payment request including the image file is received from a mobile device associated with the user initiating the payment request.

16. The computer-readable medium of claim 10, wherein the payment request is a request for payment from at least one of the persons included in the image file.

17. A system comprising:
a memory;
a communications module;
at least one hardware processor interoperably coupled with the memory and the communications module and configured to:

receive via the communications module a payment request including a value and associated with an image file, the image file including images of at least two persons;

analyze the image file associated with the payment request to identify at least one recipient of the payment request;

identify contact information associated with the at least one identified recipient of the payment request;

send via the communications module the payment request to the at least one identified recipient of the payment request via a destination associated with the identified contact information;

receive via the communications module a confirmation of the payment request from the at least one identified recipient; and facilitate the payment between a user initiating the payment request and the at least one identified recipient; and after facilitating the payment, modifying, by the processor, the image file, wherein modifying the image file comprises embedding at least one pixel modification to the image file indicating a record of the image file being used as a payment request, wherein the modified image file is stored for future comparisons to later received image files associated with later received payment requests, wherein a later submission of a non-modified image file for a later received payment request is flagged during a facial recognition process as being associated with a previous transaction, the flagging resulting in at least one of a denial of the later received payment request or in generating a notification of at least one prior payment request associated with the non-modified image file of the later received payment request; and store the modified image file in a memory.

18. The system of claim 17, wherein, in association with the received payment request, an image of at least one person in the image file is indicated to be omitted from the payment request, wherein the indication of omission from the payment request is selected by the user initiating the payment request prior to sending the payment request, wherein the user interactively selects, within the image file, the image of at least one person included in the image file for omission, and wherein analyzing the image file to identify at least one recipient of the payment request includes performing an automated computer-based facial recognition process on the images of the persons in the image file not associated with an indication to be omitted from the payment request to identify the at least one recipient of the payment request, and wherein modifying the image file comprises embedding at least one pixel modification to the image file indicating a record of the image file being used as a payment request, wherein the modified image file is stored for future comparisons to image files associated with later received payment requests, wherein later submissions of the non-modified image file for a later received payment request is flagged during the facial recognition process as being associated with a previous transaction, the flagging resulting in at least one of a denial of the later received payment request or in generating a notification of at least one prior payment request associated with the image file of the later received payment request.

* * * * *